United States Patent
Shaver

(10) Patent No.: US 12,118,617 B2
(45) Date of Patent: Oct. 15, 2024

(54) COMPUTER-IMPLEMENTED METHOD OF DIVIDEND STOCK TRACKING AND ADMINISTERING ADVANCEMENT OF DIVIDEND INCOME

(71) Applicant: David Shaver, Boca Raton, FL (US)

(72) Inventor: David Shaver, Boca Raton, FL (US)

(*) Notice: Subject to any disclaimer, the term of this patent is extended or adjusted under 35 U.S.C. 154(b) by 0 days.

(21) Appl. No.: 18/685,107

(22) PCT Filed: Aug. 7, 2023

(86) PCT No.: PCT/US2023/029638
§ 371 (c)(1),
(2) Date: Feb. 20, 2024

(87) PCT Pub. No.: WO2024/030677
PCT Pub. Date: Feb. 8, 2024

(65) Prior Publication Data
US 2024/0265453 A1    Aug. 8, 2024

Related U.S. Application Data

(60) Provisional application No. 63/395,395, filed on Aug. 5, 2022.

(51) Int. Cl.
*G06Q 40/04* (2012.01)
(52) U.S. Cl.
CPC .................. *G06Q 40/04* (2013.01)
(58) Field of Classification Search
CPC ..................................... G06Q 40/04
See application file for complete search history.

(56) References Cited

U.S. PATENT DOCUMENTS 6,064,985 A     5/2000  Anderson
6,073,104 A *   6/2000  Field ............... G16H 40/20
                                              705/2
(Continued)

FOREIGN PATENT DOCUMENTS

JP    2021073625 A  *  5/2021  .......... G06Q 20/14
WO    WO-0137184 A2 *  5/2001  .......... G06Q 40/04
WO    WO-2009036276 A1 * 3/2009 .......... G06Q 40/00

OTHER PUBLICATIONS

Krantz, Matt: How Dividends Work: Jul. 6, 2021, Online Investing for Dummies, pp. 1-6 (Year: 2021).*

(Continued)

*Primary Examiner* — Bijendra K Shrestha
(74) *Attorney, Agent, or Firm* — Mark C. Johnson; Johnson Dalal

(57) ABSTRACT

A computer-implemented method of dividend stock tracking and administering advancement of dividend income that includes registering the first user to create a first user account, receiving an identifiable dividend-based investment product account information of the first user and associating the identifiable dividend-based investment product and the first user monetary account information to first user account. The method also includes ascertaining a projected user-non-selectable dividend distribution frequency schedule and a projected dividend monetary amount associated with the identifiable dividend-based investment product and autonomously calculating an advanced dividend distribution schedule having a plurality of independent advanced dividend distribution dates selectable by the first user, an administrative fee associated with the advanced dividend distribution schedule, and an advanced dividend monetary amount associated with each of the plurality of independent advanced dividend distribution dates. The first (Continued)

user will select the advanced dividend distribution dates and receive advanced dividend income associated therewith.

19 Claims, 4 Drawing Sheets

(56) References Cited

U.S. PATENT DOCUMENTS

| | | |
|---|---|---|
| 6,760,710 B1 | 7/2004 | Perg |
| 2004/0049448 A1 | 3/2004 | Glickman |
| 2011/0106689 A1 | 5/2011 | Ryan |
| 2022/0058586 A1* | 2/2022 | Dias .............. G06Q 10/063114 |

OTHER PUBLICATIONS

PWC: Capital and divideds—achieving a sustainable and efficient model, May 2016, IFRS Spotlight, pp. 1-4 (Year: 2016).*
Pinkasovitch, Arthur: How to Use the Dividend Capture Strategy, Nov. 30, 2021, Investopedia, pp. 1-9 (Year: 2021).*

* cited by examiner

COMPUTER-IMPLEMENTED METHOD OF DIVIDEND STOCK TRACKING AND ADMINISTERING ADVANCEMENT OF DIVIDEND INCOME

FIELD OF THE INVENTION

The present invention relates generally to computer-implemented methods and systems associated with utilizing publicly traded dividend stocks and more particularly, is directed to a computer-implemented method and system allowing stockholders the ability to receive their dividend income effectively and efficiently in advance of the dividend payment date made by the company in which they own stock, reinvest advance dividend income received for a particular stock or stocks over time, track dividend stocks, and customize divided stock bundles.

BACKGROUND OF THE INVENTION

A dividend stock is a publicly traded company that regularly shares profits with shareholders through dividends. These companies tend to be both consistently profitable and committed to paying dividends for the foreseeable future. Companies can choose to pay dividends for a number of reasons, but typically it is a way of sharing the company's profits with its owners or shareholders. Stocks that pay dividends can provide a stable and growing income stream. Investors typically prefer to invest in companies that offer dividends that increase year after year, which helps outpace inflation. In the United States, companies usually pay dividends quarterly, though some pay monthly or semiannually. In either case, however, stockholders are forced to adhere to the dividend schedule and are unable to realize the benefit of their dividends until the date(s) when said dividends are actually distributed.

There are known systems and methods generally available for users to receive advanced funds or monetary payments based on expected or anticipated payments to the user, see, e.g., Scanlon, U.S. Pat. No. 8,033,453. These systems and methods are entirely unrelated to the future distribution of dividend income. Further, these systems and methods fail to provide an effective, efficient, and safe environment to manage and track dividend-based products.

Therefore, a need exists to overcome the problems with the prior art as discussed above.

SUMMARY OF THE INVENTION

The invention provides a computer-implemented method of dividend stock tracking and administering advancement of dividend income that overcomes the hereinafore-mentioned disadvantages of the heretofore-known devices and methods of this general type.

With the foregoing and other objects in view, there is provided, in accordance with the invention, a computer-implemented method of dividend stock tracking and administering advancement of dividend income that includes the steps of providing a first electronic computing device of a first user and a remote server communicatively coupled together over a network, registering the first user and creating create a first user account, receiving an identifiable dividend-based investment product and a first user monetary account information at the remote server from the first electronic computing device over the network and associating the identifiable dividend-based investment product and the first user monetary account information to first user account, ascertaining a projected user-non-selectable dividend distribution frequency schedule and a projected dividend monetary amount associated with the identifiable dividend-based investment product, autonomously calculating, at the remote server, an advanced dividend distribution schedule having a plurality of independent advanced dividend distribution dates selectable by the first user, an administrative fee associated with the advanced dividend distribution schedule, and an advanced dividend monetary amount associated with each of the plurality of independent advanced dividend distribution dates, wherein the advanced dividend monetary amount is subject to the administrative fee. The process all may include selecting the plurality of independent advanced dividend distribution dates by the first user on the first electronic computing device and receiving the advanced dividend monetary amount on each of the plurality of independent advanced dividend distribution dates and into a first user monetary account associated with the first user monetary account information.

In accordance with another feature, an embodiment of the present invention includes the step of inputting on a graphical user interface of an electronic display of the first electronic computing device the identifiable dividend-based product, the projected dividend distribution frequency schedule, and the first user monetary account information and communicating the identifiable dividend-based product, the projected dividend distribution frequency schedule, and the first user monetary account information to the remote server.

In accordance with yet another feature, an embodiment of the present invention includes autonomously calculating the advanced dividend distribution frequency schedule with date-certain advanced dividend monetary amounts associated therewith.

In accordance with an exemplary feature, an embodiment of the present invention also includes calculating the advanced dividend monetary amount based in part on the advanced dividend distribution schedule and the projected dividend monetary amount.

In accordance with yet another feature, an embodiment of the present invention includes integrating a third-party application programming interface for a financial data server enabling communication with the first electronic computing device over the network and ascertaining the projected dividend monetary amount by accessing the financial data server.

In accordance with a further feature, an embodiment of the present invention includes ascertaining a current trading value of the identifiable dividend-based investment product by accessing the financial data server and calculating the advanced dividend monetary amount based in part on the current trading value.

In accordance with another feature, an embodiment of the present invention also includes autonomously calculating a net monetary balance based on the advanced dividend monetary amounts received on each of the plurality of independent advanced dividend distribution dates, the administrative fee, and the projected dividend monetary amount.

In accordance with yet another feature, an embodiment of the present invention includes graphically displaying the net monetary balance on a graphical user interface of an electronic display of the first electronic computing device.

In accordance with an additional feature, an embodiment of the present invention includes receiving the projected dividend monetary amount at an actual dividend distribution frequency schedule associated with the identifiable dividend-based investment product into an administrative monetary account and reducing the advanced dividend monetary amount subject to the administrative fee.

In accordance with yet another feature, an embodiment of the present invention includes integrating a third-party application programming interface for a brokerage server enabling communication with the first electronic computing device over the network and selecting the identifiable dividend-based investment product from a plurality of dividend-based investment products offered through the brokerage server.

Also in accordance with the present invention, a computer-implemented method of dividend stock tracking and administering advancement of dividend income is disclosed that includes providing a first electronic computing device of a first user and a remote server communicatively coupled together over a network, registering the first user and creating a first user account, communicating an identifiable dividend-based investment product and a first user monetary account information to the remote server from the first electronic computing device over the network and associating the identifiable dividend-based investment product and the first user monetary account information to first user account, ascertaining a projected user-non-selectable dividend distribution frequency schedule and a projected dividend monetary amount associated with the identifiable dividend-based investment product, autonomously calculating, at the remote server, an advanced dividend distribution schedule having a plurality of independent advanced dividend distribution dates selectable by the first user, an administrative fee associated with the advanced dividend distribution schedule, and an advanced dividend monetary amount associated with each of the plurality of independent advanced dividend distribution dates, wherein the advanced dividend monetary amount is subject to the administrative fee. The process also includes selecting and communicating the plurality of independent advanced dividend distribution dates by the first user on the first electronic computing device and to the remote server and receiving the advanced dividend monetary amount on each of the plurality of independent advanced dividend distribution dates and into a first user monetary account associated with the first user monetary account information.

Although the invention is illustrated and described herein as embodied in a computer-implemented computer-implemented method of dividend stock tracking and administering advancement of dividend income, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having." as used herein, are defined as comprising (i.e., open language). The term "coupled." as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right." "front," "vertical." "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
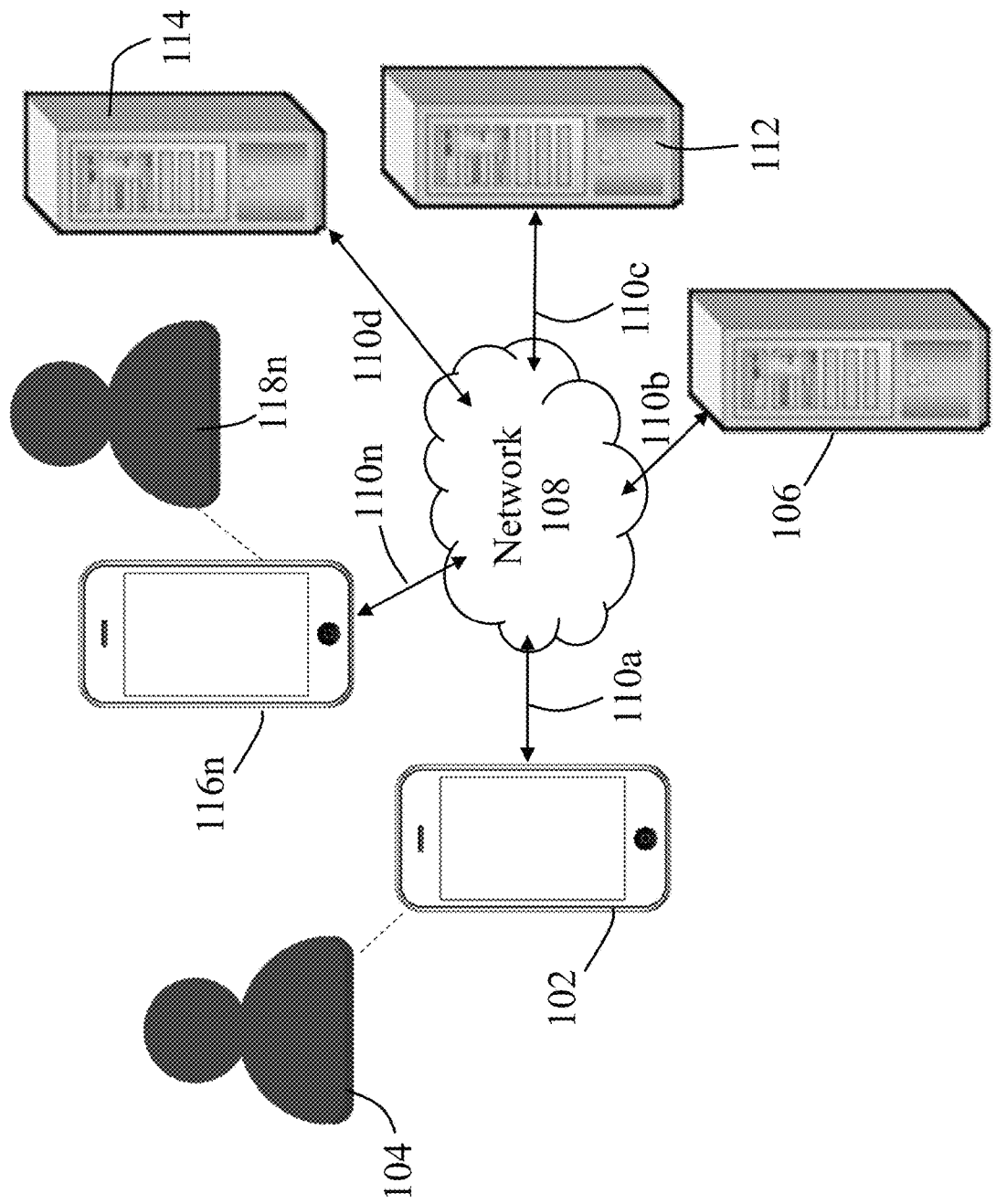
FIG. 1 is a block diagram of a computer-implemented method of dividend stock tracking and administering advancement of dividend income in accordance with one exemplary embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient computer-implemented method and system of dividend stock tracking and administering advancement of dividend income associated therewith. Referring now to FIG. 1 for example, one embodiment of the present invention is shown in a block diagram view. FIG. 1 shows several advantageous features of the present invention, but, as will be described below, the invention can be provided in several shapes, sizes, combinations of features and components, and varying numbers and functions of the components.

Figure 2:
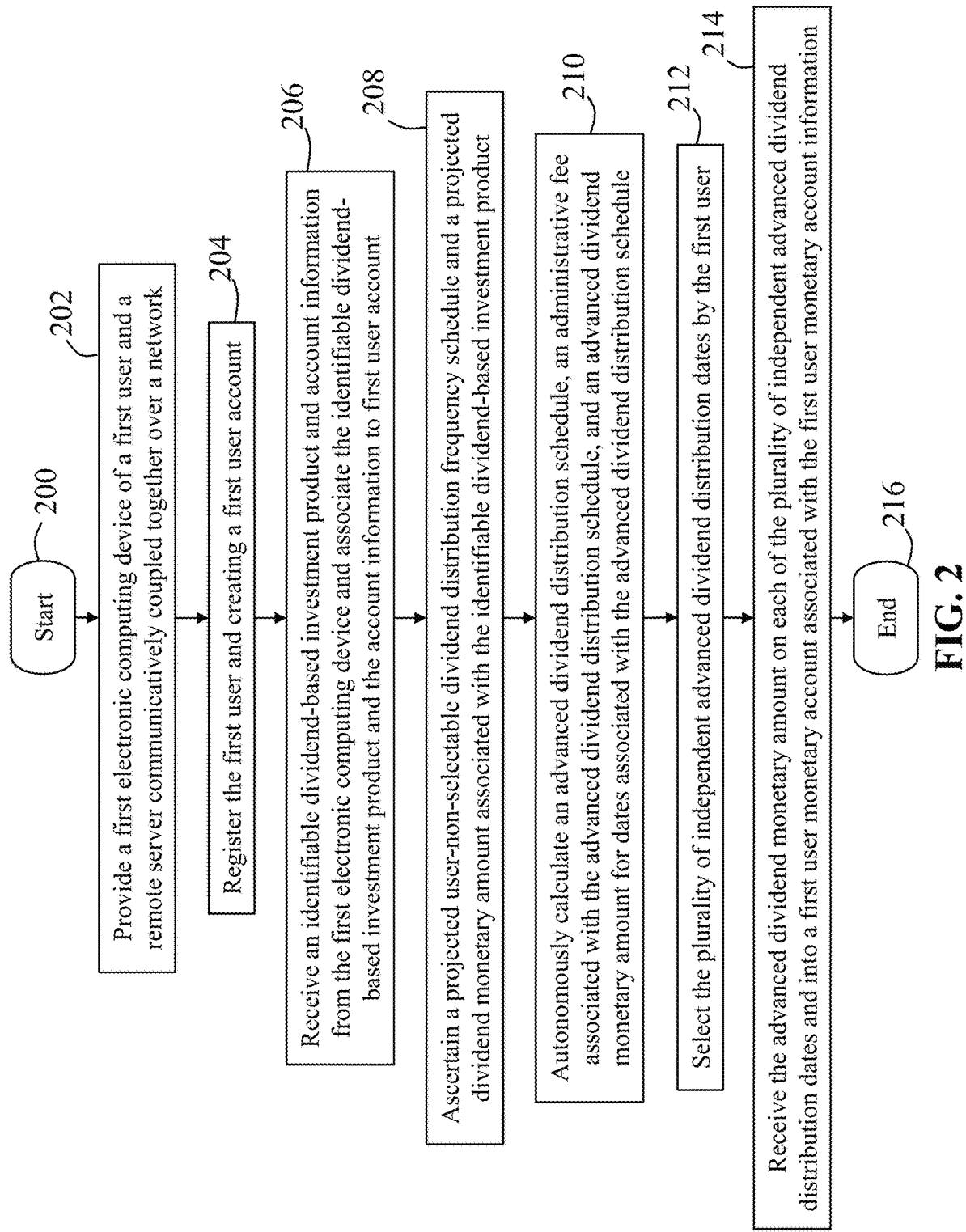
FIG. 2 is a process flow diagram depicting the steps associated with the computer-implemented method of dividend stock tracking and administering advancement of dividend income of FIG. 1, in accordance with one exemplary embodiment of the present invention.
Figure 3:
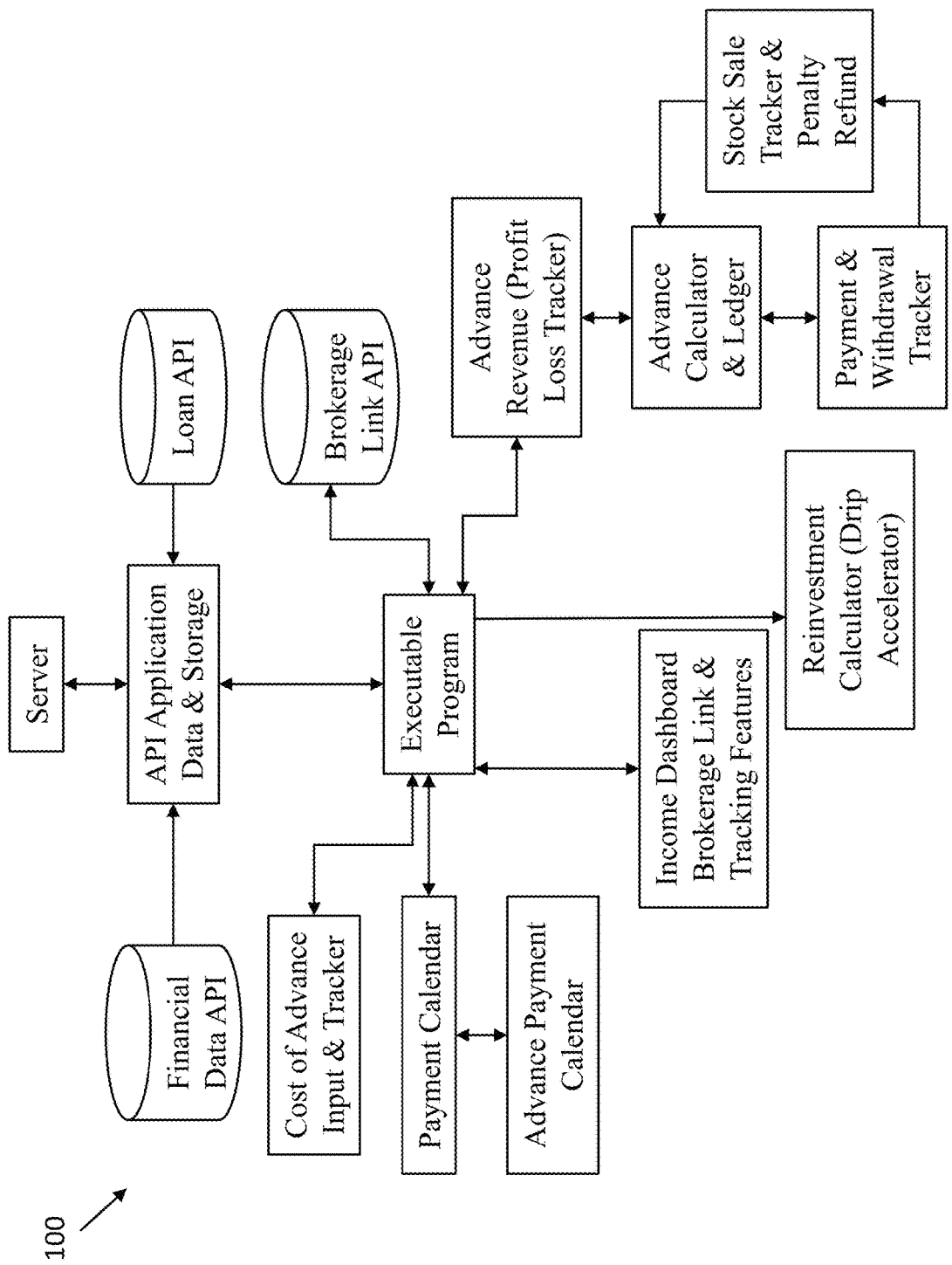
FIG. 3 is a block diagram of hardware modules and other features of the computer-implemented method of dividend stock tracking and administering advancement of dividend income in FIG. 1, in accordance with the present invention.

FIG. 1 will also be described in conjunction with the process flow chart of FIG. 2 and the block diagram FIG. 3. Although FIG. 2 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 2 for the sake of brevity. In some embodiments, some or all of the process steps included in FIG. 1 can be combined into a single process.

The process begins at step 200 and immediately proceeds to step 202 of providing a first electronic computing device 102 of a first user 104 and a remote server 106 communicatively coupled together over a network 108. In practice, the present invention is operable with a plurality electronic computing devices (e.g., 116n) of a plurality of users (e.g., user 118n), wherein "n" represents any number greater than one. As seen in FIG. 1, each electronic computing device includes an electronic display with a user input interface and includes an internal processor, a memory, and a network interface. The first electronic computing device 102 may consist of a cell phone, smart phone, laptop, tablet, desktop computer, or other comparable electronic computing or processing device. The memory is non-transitory wherein "non-transitory" is defined as a resident memory.

The electronic computing devices, which may be a cellphone or tablet, for example, are operable to execute programming instructions embodying in the process in FIG. 2 and that can be received from a computer server via a wide area network (WAN). Said differently, the electronic computing devices are operable to execute the programming instructions received from the computer server over the WAN. The process can also be embodied in a downloadable software program or application executable by the electronic computing device, namely the processor therein. In other embodiments, the process is embodied in a web-based software application or a desktop software application. In one embodiment, the WAN is the Internet. The Internet represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, the network 108 also may be implemented as a number of different types of networks, such as for example, an Intranet, a local area network (LAN), or a cellular network. FIG. 1 is intended as an example, and not as an architectural limitation for the present invention. As shown in FIG. 1, the network 108 includes connections 110a-n, which are the medium used to provide communication links between various devices and computers connected together within the network 108. The connections 110a-n may be wired or wireless connections, but said connections are preferably wireless. A few exemplary wired connections are cable, phone line, and fiber optic. Exemplary wireless connections include radio frequency (RF) and infrared radiation (IR) transmission. Many other wired and wireless connections are known in the art and can be used with the present invention.

The network interface on each electronic computing device may include one or more network interface cards (NIC) or a network controller. In some embodiments, the network interface may include a personal area network (PAN) interface. The PAN interface may provide the capability for the user's computing devices to network using a short-range communication protocol, for example, a Bluetooth communication protocol. The PAN interface may permit one personal computing device to connect wirelessly to another personal computing device via a peer-to-peer connection. The network interface may also include a local area network (LAN) interface. The LAN interface may be, for example, an interface to a wireless LAN, such as a Wi-Fi network. The range of the LAN interface may generally exceed the range available via the PAN interface. Typically, a connection between two electronic devices via the LAN interface may involve communication through a network router or other intermediary device. Additionally, the network interface 204 may include the capability to connect to a wide area network (WAN) via a WAN interface. The WAN interface may permit a connection to, for example, a cellular mobile communications network. The WAN interface may include communications circuitry, such as an antenna coupled to a radio circuit having a transceiver for transmitting and receiving radio signals via the antenna. The radio circuit may be configured to operate in a mobile communications network, including but not limited to global systems for mobile communications (GSM), code division multiple access (CDMA), wideband CDMA (WCDMA), and the like.

Once the first electronic computing device 102 and server 106 are communicatively coupled, step 204 may include registering the first user 104 and creating create a first user account, wherein the user 104 will provide personal and financial information on the user and the user's identifiable dividend-based investment product (e.g., a publicly traded stock). The first user 104 may enter the user's information through the device's digital graphical user interface (GUI) on the electronic display and using a plurality of digital data input fields operably configured to receive alpha-numeric text. The first user account may be stored on the remote server 106 or resident on the device 102. Each user account for the plurality of users are independent of one another.

Step 206 includes receiving an identifiable dividend-based investment product and a first user monetary account information (e.g., bank account number and routing number) at the remote server 106 from the first electronic computing device 102 and over the network 108. The process also includes associating the identifiable dividend-based investment product and the first user monetary account information to first user account. The identifiable dividend-based investment product may include a single investment product, or stock(s), or, beneficially, a bundle of investment products. Therefore, the present invention enables users and the software to track and customize dividend stock(s) or stock bundles, and administer, on a predetermined schedule, advancement of dividend income anticipated to be received by a user in connection with the customized dividend stock(s) or stock bundles, i.e., "SecondSalary." SecondSalary is a do-it-yourself second income builder, dividend stock tracker, and informational resource. It allows users to design a passive income stream using publicly traded dividend stocks. The SecondSalary calculator can show groups of 1-10 dividend stocks bundled together (stock bundle) and displays the yield of the group as well as individual stocks when selected. Once a stock bundle displaying a desired average yield is selected, users can calculate the projected dividend income payable based on the number of owned shares and select an online brokerage to purchase shares in the companies displayed that best suit their strategy.

Said differently, step 208 includes ascertaining a projected user-non-selectable dividend distribution frequency schedule and a projected dividend monetary amount associated with the identifiable dividend-based investment product, as the actual dividend payment dates are not usually available until the month before the dividend is declared. The dividend distribution frequency schedule is user-non-selectable in that it is not dictated or controlled by the user; rather, it is typically controlled by a third party, e.g., board of directors, governing company documents, etc. In one embodiment, the projected user-non-selectable dividend distribution frequency schedule and a projected dividend monetary amount are provided directly by the user 104. In other embodiments, the projected user-non-selectable dividend distribution frequency schedule and a projected dividend monetary amount are ascertained by the administrator or through a third-party application programming interface enabling communication with a financial data server 114, wherein the third-party associated with the financial data server 114 provides the application data and storage, including the projected user-non-selectable dividend distribution frequency schedule and a projected dividend monetary amount, for the method. In some embodiments, the projected user-non-selectable dividend distribution frequency schedule and a projected dividend monetary amount are projected from the dividend history of the identifiable dividend-based investment product and current trading price of the identifiable dividend-based investment product. Further, in one embodiment the process includes ascertaining a current trading value of the identifiable dividend-based investment product by accessing the financial data server 114 and calculating the advanced dividend monetary amount based in part on the current trading value. In one embodiment, the process includes autonomously calculating the advanced dividend distribution frequency schedule with date-certain advanced dividend monetary amounts associated therewith, i.e., the dates are specifically selected by the user. Further, the process includes calculating the advanced dividend monetary amount based in part on the advanced dividend distribution schedule and the projected dividend monetary amount.

In step 210, the process may include autonomously calculating, at the remote server 106, an advanced dividend distribution schedule having a plurality of independent advanced dividend distribution dates selectable by the first user 104, an administrative fee (that may, for example, be percentage-based or a flat rate) associated with the advanced dividend distribution schedule, and an advanced dividend monetary amount associated with each of the plurality of independent advanced dividend distribution dates. The calculation may be done through an algorithm or equation (as exemplified below) and may occur using a processor resident in the remote server 106.

The advanced dividend monetary amount will be subject to the administrative fee (as described in more detail below). Beneficially, the advanced dividend distribution dates are "independent", in that they are dictated or controlled without utilization of the projected user-non-selectable dividend distribution frequency schedule, thereby allowing the user, as opposed to a third party, to control when the user receives the dividend income.

To that end, step 212 includes selecting the plurality of independent advanced dividend distribution dates by the first user 104 on the first electronic computing device 102 and step 214 includes receiving the advanced dividend monetary amount on each of the plurality of independent advanced dividend distribution dates selected by the user and into a first user monetary account associated with the first user monetary account information. The projected dividend monetary amount will then be received in the first user monetary accounts or an administrative account where the administrative fee calculated off of the advanced dividend monetary amount and the advanced dividend monetary amount will be reduced therefrom and where the total balance of the dividends received can be monitored and tracked. Said differently, in one embodiment the process includes receiving the projected dividend monetary amount at an actual dividend distribution frequency schedule associated with the identifiable dividend-based investment product into an administrative monetary account (that is not associated with the first user 104) and then reducing the advanced dividend monetary amount subject to the administrative fee and the advanced dividend. In some embodiments, the software will permit the user to reinvest advanced dividend monetary amount or any balances into other identifiable dividend-based investment products (thereby increasing potential profit generated from the software application). The process may terminate at step 216.

Additionally, however, users of the software or process can receive their dividend income directly through their brokerage account, which may involve integrating a third-party application programming interface (API) enabling communication with the first electronic computing device 102 over the network 108. Then, the user may select the identifiable dividend-based investment product from a plurality of dividend-based investment products offered through the brokerage server 112. All users can securely link their brokerage account with their SecondSalary user account using the third-party API to receive intuitive portfolio income tracking features and insights. For experienced dividend investors, SecondSalary offers best in class tools for tracking income, the ability to create a custom stock bundle with average yield, and gain visibility into company financials, as well as insider, and institutional ownership.

The above-referenced method of advancing dividends may be referred to as a "dividend advance" to allow stockholders the ability to receive their dividend income in advance of the dividend payment date made by the company in which they own stock. Specifically, in return for a fee (either fixed, or % interest) the advancing, factoring, financing of dividend income payments to stockholders is provided so stockholders can receive the projected dividend income on a desired schedule versus the quarterly, or monthly distribution schedule dividend stocks' traditionally payout. However, if a stock pays dividend income on a monthly basis, the stockholder would have the option of receiving that income on the first of the month regardless of the actual payment date. Dividend advance therefore allows the stockholder, or user 104, to receive their dividend income sooner, allows the user 104 to reinvest and/or repurchase stock with those funds, or take the funds in cash on a more frequent basis.

For example, a stockholder could receive their dividend income over twelve equal monthly payments, by-yearly, or even over twenty-six by-weekly pay periods in line with the stockholder's preference regardless of when the company pays the dividend. More specifically, if a company pays dividends to its shareholders on a quarterly basis for example: February, May, August, and November, dividend advance would pay the estimated annual dividend amount minus a disclosed fee based on the number of owned shares on the 1st of the month following the month in which the shares were purchased. Assuming the shares were purchased in December of a given calendar year, the first payment of dividend income would be January 1 and every month thereafter for a total of twelve equal payments ending in December, provided the stockholder selected the monthly payment option and continued to own the stock throughout the period. If the stock was purchased mid-year, the remaining estimated income for that calendar year would be paid starting on the first of the month after the shares were purchased.

In one embodiment of the present invention, the user is any stockholder (end-user), i.e., a non-bank/brokerage client, wishing to have their dividend income advanced to them. For example, Stockholder A purchases 360 shares of XXX stock & 360 shares of YYY stock through a selected brokerage trading platform. Assuming each stock pays an estimated $2.00/per share dividend annually equal to a 6% annual yield based on a purchase price per share of $33.33 at the time of purchase. Stockholder A's estimated annual dividend income is: $1,440 based on 720 shares owned. Assuming XXX's dividend payment schedule pays: $180 on March 10, June 5, September (TBA), December (TBA) and YYY the same months but different dates not yet available. Actual dividend payment dates aren't usually available until the month before the dividend is declared. Stockholder A sees the dividend advance feature through the user's profile, or a non-brokerage partner site. Once selected, Stockholder A is directed to a workflow where the user may have the option of requesting to receive their $1,440 annual income spread out over twelve months $120/month on the first of the month (minus a 3% advance fee as an example) equating to $116.40/mo. deposited on the first of each month in the account of their choice. Or, $53.72 by-weekly by advancing 97% of the projected dividend income on either a monthly, or biweekly basis and averaging it out over the selected term.

In accordance with this embodiment of the method 100, Stockholder A purchases the stock through a trading platform, their own, or a partner platform of SecondSalary. Stockholder A has the option to link their brokerage account with their SecondSalary profile using account validation and verification API partner technology. This is also seen best in FIG. 3. Once the link is complete, the user's stock ownership position (with the selected brokerage) is captured on Stockholder A's SecondSalary profile, or partner profile (which could be branded, or white labeled for partner sites).

On SecondSalary the profile would include as follows: The book/market value, dividend payment amount, yield at cost, market yield, and projected dividend pay days/months (payday calendar) of the stockholder's holdings. The software application may enable Stockholder A to have an option (button), or message within their profile that reads "dividend advance", or "receive your dividend income on your schedule" when clicked the projected dividend income is displayed over the preceding number of months left in the current year, or preceding twelve-month period with the calculated fee/interest clearly displayed as the cost of the advance. In addition, the payday calendar without the advance showing the projected dividend pay dates is displayed in comparison so Stockholder A can clearly see both options in comparison. If Stockholder A proceeds to click next or "apply Stockholder A is required to complete a series of questions (similar to a personal loan application). This loan process may also be implemented through a third-party API. The process will include a soft credit pull, and guarantee that the advanced funds will be repaid under all circumstances. Including the sale of the stock, a dividend cut (whole, or part), the company becoming bankrupt, no longer trading on an exchange, or becoming insolvent. The requirement for repayment of the advance is clearly defined within this process. In addition, the client can select the account, i.e., first user monetary account, in which they choose to have the dividend advance funds deposited into as well as the account in which they choose to have the repayment funds withdrawn from. In some embodiments, the aforementioned accounts can be the same. The withdrawal date, or repayment date would be set and actioned through a PAC agreement (preauthorized contribution) within 48 hours following a specific stock's scheduled dividend payment date. This allows Stockholder A time to receive the dividend payment before it is withdrawn to cover Stockholder A's cost of the advance. As alternative to the PAC option of withdrawal, Stockholder A would have the option to assign their dividend payment to a dividend advance or Second-Salary controlled account in return for access to the advanced funds. This way the dividend income once received on the scheduled dividend date is deposited directly in an account controlled directly by SecondarySalary, i.e., the administrator, removing the need for a withdrawal. This process would mimic a factoring agreement, could involve a security interest taken in the underlying stock, and would involve prior bank and necessary regulatory approval.

Once the application is complete Stockholder A can again view a payday calendar of the advanced dividend schedule with the correct stocks selected in which they want to receive an advance. In addition, they can review terms describing how repayment of dividend advance payment may be adjusted based on the actual/projected dividend paid, if the stock is sold, or if purchase takes place after, or before the ex-dividend date. Stockholder A's application is sent to underwriting for approval. If denied Stockholder A is sent a non-approval notice and no further action is required. If Stockholder A is approved, they will have the option to select/review the specific company stock in which they want to receive the advance and be given the option to add a certain number of new securities (stock) to the list when linked through a brokerage account without having to reapply.

In one embodiment, the process includes inputting on a graphical user interface of an electronic display of the first electronic computing device 102 the identifiable dividend-based product, the projected dividend distribution frequency schedule, and the first user monetary account information and communicating the identifiable dividend-based product, the projected dividend distribution frequency schedule, and the first user monetary account information to the remote server 106 where it can be utilized and/or stored with the user' account.

Depending on the projected user-non-selectable dividend distribution frequency schedule (monthly, quarterly, by-yearly), the administrative fee (cost) for the advance may vary based on the time period between when the advance is paid versus the company dividend payment date. At this stage Stockholder A's dividend stocks are displayed within the SecondSalary dashboard and information tracking dividend income, specific dividend data as well as both market data and news about the specific stock holdings. If Shareholder A wants to remove themselves from the dividend advance feature, the user may deselect some or all of the stocks in which they want removed and the calendar will adjust accordingly with the original pay months/dates. Any advanced proceeds will be deducted from the next company scheduled dividend payment and the advanced balance due will be displayed below the advance calendar, or in the advance ledger.

If Shareholder A sells stock in which a dividend advance is active, the user is responsible for repaying the advance to date if the advance exceeds what has been repaid (withdrawn) and notice will be provided of such. It is also possible that SecondSalary may hold a security interest in the stock and therefore collect any advance balance owing from the sale proceeds. If Shareholder A sells stock in which a dividend advance is active and the amount advanced to date is less than the amount paid/withdrawn following a company's dividend payment. SecondSalary will return the difference to Stockholder A. SecondSalary will provide dividend monitoring type information in an effort to forecast the health of the company and its ability to maintain the level of dividend. In addition, a digital ledger of Stockholder A's advance position will be tracked displaying the current/effective advance balance position (either positive or negative of each stock) based on the current date and time.

The software application may also utilize programming modules. A "Cost of Advance Input & Tracker" module allows for a set percentage or fixed fee to be input as a cost associated with the advance. The fee would be set as the cost associated with the cost of the funds used for the advance. If a revolving line of credit was used as a funding source at 7% annual interest rate, this module would allow for tracking and measurement of cost and work in unison with the Advance Revenue (profit and loss calculator). The "Advance Revenue (Profit Loss) Tracker" module allows for tracking the profit and loss calculation of a specific clients' advance. Specially, by subtracting the advance revenue earned by the input cost of the advance for the period until repayment occurs. Although the dividend advance is provided on frequent/consistent basis, the actual dividend payment date can vary per company therefore a comprehensive tracking system is required in order to understand the true cost of an advance over a certain period (days, months) and how that period can change based on when a specific company, or companies confirms the dividend payment date. Said differently, the process may include autonomously calculating a net monetary balance based on the advanced dividend monetary amounts received on each of the plurality of independent advanced dividend distribution dates, the administrative fee, and the projected dividend monetary amount. Preferably, the electronic computer device 102 will graphically display the net monetary balance on a graphical user interface of an electronic display of the first electronic computing device 102 for viewing and action by the user 104.

The "Payment Calendar" module displays the quantity and description of stock owned, the estimated dividend amount to be paid, the month the dividend is paid, and the total amount paid based on the quantity of holding. The "Advanced Payment Calendar" module displays the quantity and description of stock owned, the estimated advanced dividend amount to be paid over the preceding twelve-month period (averaged over twelve months). For example, Stockholder A may have an annual cost of 3% ($1,459) to advance estimated dividend income of $48,624 annually. Based on the advance ledger, SecondSalary's average monthly—deficit is: −$1,096 with the highest at: −$1,643, and lowest at: −$549. The full monthly advance is −$3,930. Using the full monthly advance of −$3,930 (even though this number is reduced within the month by dividend payment income) a cost of 7% annually and assuming an advance of 90 days (even though repayment should be closer to 45 days), the cost of this advance is calculated as follows: ($3,930×7%)/12×(3)=$68.78. The cost charged could change based on the frequency of the dividend payment associated with the respective stock. The Gross Advance Fee Revenue is $1,459.00, and the Gross Advance Fee Cost is $68.78.

Figure 4:
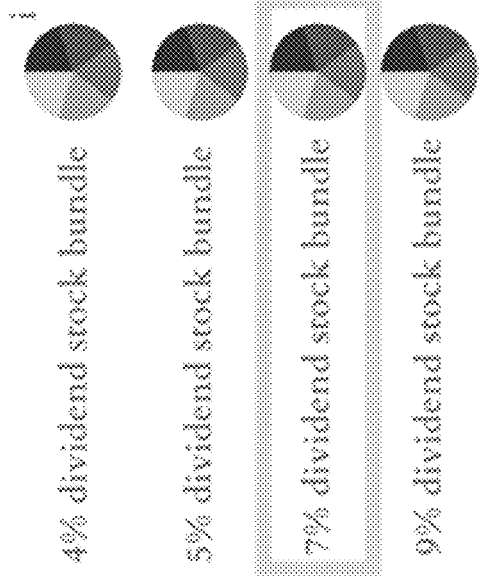
FIG. 4 is a screenshot depicting an "Income Dashboard Brokerage Link & Tracking Features" module utilized in accordance with one embodiment of the present invention.

With reference to FIG. 4, an exemplary screenshot depicting an "Income Dashboard Brokerage Link & Tracking Features" module is depicted. The SecondSalary Calculator allows for individuals to set a target income, select a bundle of dividend stocks that are averaging (based on current market data) the desired dividend yield, and receive an estimate as to how many shares they would need to purchase in order to achieve the target income. The Portfolio Dashboard enables users to view specific information about their holdings and may include following exemplary information:

Estimated Annual Income $12,000
Estimated Monthly Income: $1,000
Yield at Cost (average): 4.1%
Market Yield (average): 4.1%
Total Cost: $24,500
Total Value: $24,700
Total Gain/Loss: $200/0.4%
Dividend Income Received: $502.25

A "Stock Search and Bundle Builder" is a free flow area where the user can search stocks, review specific company information, and build sample bundles. In addition, users can research (A-Z listing of dividend stocks, categorized, and searchable based on % yield), dividend monitoring, build their own bundles, and seek inspiration based on a number of cool stats and detailed information. A "Portfolio Link" allows for the user to link their brokerage portfolio with SecondSalary, or a site using this module under license of SecondSalary.

The "Reinvestment Calculator (DRIP Accelerator)" module features the calculation associated with reinvesting advanced dividend income in comparison with reinvestment of dividend income received on a traditional basis. The output of this feature allows for the user to see the potential benefit of reinvestment of advance dividend income for a particular stock, or stocks over time. In one embodiment, the potential benefit of reinvestment of dividends received on a monthly basis (first of the month) versus their scheduled quarterly pay period can be realized. Specifically, a twenty-four month sample data was collected using end of day pricing for a particular stock (years 2020/2021). The monthly dividend advance option allowed for more frequent purchases, and more frequent dividend reinvestment. The result after twelve months was the monthly advance option allowed for a $32.60 average cost per share, versus $33.62 (quarterly) and 2.35 more shares purchased through more frequent reinvestment of dividends. By the end of twenty-four months the monthly advance option allowed for more than 9.23 additional shares purchased through advance dividend reinvestment than the quarterly. In the instance above, the cost of the advance was completely covered plus additional revenue was earned in the form of additional shares purchased. This example takes into account two methods of reinvestment, dollar cost averaging, and time value of money i.e., a sum of money is worth more now than the same sum of money in the future.

The "Payment & Withdrawal Tracker" module allows for tracking of the repayment of the advance (loan solution) either through PAC, or the dividend payment transferred to the appropriate account for repayment of the advance. This module interacts with other modules in order to determine if the stockholder is a holder of the stock before the ex-dividend date in order to determine both the correct advance is provided, but that appropriate dividend funds paid are sufficient to more than cover the cost of the advance.

The "Stock Sale Tracker" module allows for tracking of whether a security is sold with, or without the stockholder disclosing the sale. This module is vital to ensure an advance is not being provided for a stock no longer owned, but also important to ensure that if the stock is sold after the ex-dividend date it should earn dividend income. In addition, this module would rectify and balance any difference between advanced funds and dividend income received based on a stock sale, adjustments in estimated income, or an increase, or decrease in a dividend payment amount.

In another embodiment of the present invention, the user 104 may be an established brokerage or bank that offers a trading platform for their clients to buy and sell securities. The user in this example is likely supporting several managed and self-directed brokerage accounts. The application for Dividend Advance & Accelerated DRIP would be to license the Technology Process for Tracking and Administering the Advancement of Dividend income so they can offer this feature to their existing clients. In addition, each brokerage could choose the modules within the process they wish to use or use the process entirely under license. In this example, SecondSalary would work directly with the brokerage with the setup of features necessary to facilitate a Dividend Advance or Accelerated DRIP within their product suite. Including integration and the use of modules applicable/suitable based on the brokerage's existing resources, software, licensing, and current technology stack.

SecondSalary is not an investment advisor, and does not provide investment counsel, or advice. Instead, it provides detailed information on publicly traded companies that pay a dividend (portion of their profit to their shareholders) for holding their stock. This is so our users can quickly understand how much certain stocks pay, how long they've paid a dividend? have they ever cut their payment?, as well as, why a really high dividend payment, or yield % might not always lead to sustainable income. Through "directlink" our users can securely link their brokerage account to their SecondSalary profile so all their stock information is up to date.

Through investment in units of an ETF, Trust, or Mutual Fund type of financial instrument investors can and do benefit from the dividend income generated and paid out by the stock holdings, or securities held by a specific financial instrument. Dividends paid by stocks held by these financial instruments are generally paid first to the ETF, Trust, or Fund before being passed to its unit holders. The manager of the financial instrument can then either distribute the dividend income to the unit holders or purchase more shares with the proceeds. The managers of these financial instruments have certain flexibility detailed within the prospectus for when to distribute dividend income, otherwise different from the date when the underlying stock distributes the dividend income to its shareholders. Unit holders do not usually receive interest on dividend income held by the financial instrument before distribution.

It is important to note however, that many of these types of financial instruments are distributing income to their unit holders that includes interest, capital gains, and other income sources in addition to dividend income generated through stock holdings. In many incidents, these investment instruments distribute a quarterly, or monthly dividend that may not be tethered timewise to the date the underlying stock distributes the dividend to its shareholders. For example, an investment trust may distribute dividends quarterly in respect of dividend income accumulated during a specific period in respect of the stock, or securities held by the Trust net of Trust fees and expenses. In the case of a Mutual Fund there are different types of yields to consider and how these impact the distribution of dividend income distributed by the funds underlying holdings. The Trailing Twelve Months yield (TTM) refers to the percentage of total income a fund returned to investors over the preceding twelve months whereas, a 30-day SEC yield refers to a calculation that is based on the 30 days ending on the last day of the previous month.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A computer-implemented method of dividend stock tracking and administering advancement of dividend income comprising the steps of:
providing a first electronic computing device of a first user and a remote server communicatively coupled together over a network;
registering the first user and creating create a first user account;
receiving an identifiable dividend-based investment product and a first user monetary account information at the remote server from the first electronic computing device over the network and associating the identifiable dividend-based investment product and the first user monetary account information to first user account;
ascertaining a projected user-non-selectable dividend distribution frequency schedule and a projected dividend monetary amount associated with the identifiable dividend-based investment product;
autonomously calculating, at the remote server, an advanced dividend distribution schedule having a plurality of independent advanced dividend distribution dates selectable by the first user, an administrative fee associated with the advanced dividend distribution schedule, and an advanced dividend monetary amount associated with each of the plurality of independent advanced dividend distribution dates, wherein the advanced dividend monetary amount is subject to the administrative fee;

selecting the plurality of independent advanced dividend distribution dates by the first user on the first electronic computing device; and receiving the advanced dividend monetary amount on each of the plurality of independent advanced dividend distribution dates and into a first user monetary account associated with the first user monetary account information.

2. The computer-implemented method according to claim 1, further comprising:

inputting on a graphical user interface of an electronic display of the first electronic computing device the identifiable dividend-based product, the projected dividend distribution frequency schedule, and the first user monetary account information and communicating the identifiable dividend-based product, the projected dividend distribution frequency schedule, and the first user monetary account information to the remote server.

3. The computer-implemented method according to claim 1, further comprising:

autonomously calculating the advanced dividend distribution frequency schedule with date-certain advanced dividend monetary amounts associated therewith.

4. The computer-implemented method according to claim 3, further comprising:

calculating the advanced dividend monetary amount based in part on the advanced dividend distribution schedule and the projected dividend monetary amount.

5. The computer-implemented method according to claim 4, further comprising:

integrating a third-party application programming interface for a financial data server enabling communication with the first electronic computing device over the network; and ascertaining the projected dividend monetary amount by accessing the financial data server.

6. The computer-implemented method according to claim 5, further comprising:

ascertaining a current trading value of the identifiable dividend-based investment product by accessing the financial data server and calculating the advanced dividend monetary amount based in part on the current trading value.

7. The computer-implemented method according to claim 5, further comprising:

autonomously calculating a net monetary balance based on the advanced dividend monetary amounts received on each of the plurality of independent advanced dividend distribution dates, the administrative fee, and the projected dividend monetary amount.

8. The computer-implemented method according to claim 7, further comprising:

graphically displaying the net monetary balance on a graphical user interface of an electronic display of the first electronic computing device.

9. The computer-implemented method according to claim 1, further comprising:

receiving the projected dividend monetary amount at an actual dividend distribution frequency schedule associated with the identifiable dividend-based investment product into an administrative monetary account and reducing the advanced dividend monetary amount subject to the administrative fee.

10. The computer-implemented method according to claim 1, further comprising:

integrating a third-party application programming interface for a brokerage server enabling communication with the first electronic computing device over the network; and selecting the identifiable dividend-based investment product from a plurality of dividend-based investment products offered through the brokerage server.

11. A computer-implemented method of dividend stock tracking and administering advancement of dividend income comprising the steps of:

providing a first electronic computing device of a first user and a remote server communicatively coupled together over a network;

registering the first user and creating a first user account;

communicating an identifiable dividend-based investment product and a first user monetary account information to the remote server from the first electronic computing device over the network and associating the identifiable dividend-based investment product and the first user monetary account information to first user account;

ascertaining a projected user-non-selectable dividend distribution frequency schedule and a projected dividend monetary amount associated with the identifiable dividend-based investment product;

autonomously calculating, at the remote server, an advanced dividend distribution schedule having a plurality of independent advanced dividend distribution dates selectable by the first user, an administrative fee associated with the advanced dividend distribution schedule, and an advanced dividend monetary amount associated with each of the plurality of independent advanced dividend distribution dates, the advanced dividend monetary amount subject to the administrative fee;

selecting and communicating the plurality of independent advanced dividend distribution dates by the first user on the first electronic computing device and to the remote server; and receiving the advanced dividend monetary amount on each of the plurality of independent advanced dividend distribution dates and into a first user monetary account associated with the first user monetary account information.

12. The computer-implemented method according to claim 11, further comprising:

inputting on a graphical user interface of an electronic display of the first electronic computing device the identifiable dividend-based product, the projected dividend distribution frequency schedule, and the first user monetary account information and communicating the identifiable dividend-based product, the projected dividend distribution frequency schedule, and the first user monetary account information to the remote server.

13. The computer-implemented method according to claim 11, further comprising:

autonomously calculating the advanced dividend distribution frequency schedule with date-certain advanced dividend monetary amounts associated therewith.

14. The computer-implemented method according to claim 13, further comprising:

calculating the advanced dividend monetary amount based in part on the advanced dividend distribution schedule and the projected dividend monetary amount.

15. The computer-implemented method according to claim 14, further comprising:

integrating a third-party application programming interface for a financial data server enabling communication with the first electronic computing device over the network; and ascertaining the projected dividend monetary amount by accessing the financial data server.

16. The computer-implemented method according to claim 15, further comprising:

ascertaining a current trading value of the identifiable dividend-based investment product by accessing the financial data server and calculating the advanced dividend monetary amount based in part on the current trading value.

17. The computer-implemented method according to claim 15, further comprising:

autonomously calculating a net monetary balance based on the advanced dividend monetary amounts received on each of the plurality of independent advanced dividend distribution dates, the administrative fee, and the projected dividend monetary amount.

18. The computer-implemented method according to claim 17, further comprising:

graphically displaying the net monetary balance on a graphical user interface of an electronic display of the first electronic computing device.

19. The computer-implemented method according to claim 11, further comprising:

receiving the projected dividend monetary amount at an actual dividend distribution frequency schedule associated with the identifiable dividend-based investment product into an administrative monetary account and reducing the advanced dividend monetary amount subject to the administrative fee.

* * * * *